US012364314B2

(12) United States Patent
Chen

(10) Patent No.: US 12,364,314 B2
(45) Date of Patent: Jul. 22, 2025

(54) FASTENING DEVICE INSTALLING METHOD AND INSTALLING HOLE FORMING MECHANISM

(71) Applicant: Chin-Chu Chen, Taichung (TW)

(72) Inventor: Chin-Chu Chen, Taichung (TW)

( * ) Notice: Subject to any disclaimer, the term of this patent is extended or adjusted under 35 U.S.C. 154(b) by 0 days.

(21) Appl. No.: 18/064,914

(22) Filed: Dec. 12, 2022

(65) Prior Publication Data

US 2023/0111649 A1 Apr. 13, 2023

Related U.S. Application Data

(62) Division of application No. 16/747,550, filed on Jan. 21, 2020, now Pat. No. 11,547,182.

(60) Provisional application No. 62/798,485, filed on Jan. 30, 2019.

(51) Int. Cl.
*A43D 8/18* (2006.01)
*B26F 1/24* (2006.01)
*B26F 1/32* (2006.01)

(52) U.S. Cl.
CPC .................. *A43D 8/18* (2013.01); *B26F 1/24* (2013.01); *B26F 1/32* (2013.01)

(58) Field of Classification Search
CPC ..... A43D 8/18; B26F 1/24; B26F 1/32; A43B 5/049; A43B 5/048; A43C 11/165; A43C 11/20
See application file for complete search history.

(56) References Cited

U.S. PATENT DOCUMENTS 1,062,626 A * 5/1913 Weidrich ............ B25B 27/0028 29/235
1,373,671 A * 4/1921 Rasmussen .......... A43D 100/02 29/243.517
1,440,308 A * 12/1922 Maloy .................. A43D 100/02 227/52
1,499,625 A * 7/1924 Miller .................... A41H 37/04 29/512
1,612,442 A * 12/1926 Jacques ................ A43D 100/02 24/713.7
1,692,182 A * 11/1928 Mayer .................. A43D 100/02 29/432.1
1,748,951 A * 3/1930 Sylvester ............. A43D 100/02 29/512

(Continued)

FOREIGN PATENT DOCUMENTS

CN 1047797 A 12/1990
CN 2380072 Y 5/2000

(Continued)

*Primary Examiner* — Jonathan G Riley
(74) *Attorney, Agent, or Firm* — CKC & Partners Co., LLC

(57) ABSTRACT

An installing hole forming mechanism includes at least one guiding sleeve and an inserting set. The at least one guiding sleeve includes a bore. The inserting set is detachably coupled to the at least one guiding sleeve and includes at least one spike configured to couple to the bore of the at least one guiding sleeve. The at least one spike includes a tip. When the at least one spike passes through the bore of the at least one guiding sleeve, the tip exposes from the guiding sleeve, and the at least one spike and the at least one guiding sleeve are forced to puncture a shoe such that at least one installing hole is formed on the shoe.

9 Claims, 20 Drawing Sheets

(56) References Cited

U.S. PATENT DOCUMENTS

| | | | | | |
|---|---|---|---|---|---|
| 1,748,952 | A * | 3/1930 | Sylvester | A44B 13/0082 | 24/713.7 |
| 2,024,365 | A * | 12/1935 | Inman | B26F 1/24 | 101/26 |
| 2,087,969 | A * | 7/1937 | Sylvester | A43D 100/02 | 29/243.517 |
| 2,445,761 | A * | 7/1948 | Castle | A43D 100/02 | 227/15 |
| 2,550,788 | A * | 5/1951 | Jan | A41H 37/02 | 29/512 |
| 2,828,881 | A * | 4/1958 | Lindly | A43D 100/02 | 227/55 |
| 2,830,485 | A * | 4/1958 | Macy | F16B 19/1081 | 29/512 |
| 4,161,059 | A * | 7/1979 | Francois | F16G 3/16 | 29/523 |
| 5,333,398 | A * | 8/1994 | Seo | A43C 7/00 | 24/712.9 |
| 6,158,096 | A * | 12/2000 | Bar | A43C 11/20 | 24/712.9 |
| 6,694,643 | B1 * | 2/2004 | Hsu | A43C 7/00 | 24/712.1 |
| 8,468,657 | B2 * | 6/2013 | Soderberg | A43C 1/06 | 242/395 |
| 8,858,482 | B2 * | 10/2014 | Ingimundarson | A61F 5/0123 | 128/882 |
| 9,700,101 | B2 * | 7/2017 | Lovett | A43C 11/008 | |
| 10,561,204 | B2 * | 2/2020 | Ha | A43C 11/165 | |
| 2008/0172848 | A1 * | 7/2008 | Chen | A43C 11/165 | 24/68 SK |
| 2010/0251524 | A1 * | 10/2010 | Chen | A43C 11/165 | 24/713.2 |
| 2020/0237052 | A1 * | 7/2020 | Chen | B26F 1/32 | |

FOREIGN PATENT DOCUMENTS

| | | | |
|---|---|---|---|
| CN | 101513289 | A | 8/2009 |
| CN | 104257038 | A | 1/2015 |
| CN | 104839942 | A | 8/2015 |
| CN | 105517459 | A | 4/2016 |
| CN | 106889702 | A | 6/2017 |
| CN | 207821231 | U | 9/2018 |
| ES | 202165 | U | 11/1975 |
| WO | 2005094624 | A1 | 10/2005 |

* cited by examiner

FASTENING DEVICE INSTALLING METHOD AND INSTALLING HOLE FORMING MECHANISM

RELATED APPLICATIONS

The present application is a Divisional Application of the U.S. application Ser. No. 16/747,550, filed Jan. 21, 2020, which claims priority to U.S. Provisional Application Ser. No. 62/798,485, filed Jan. 30, 2019, which are herein incorporated by reference.

BACKGROUND

Technical Field

The present disclosure relates to an installing method and an installing hole forming mechanism. More particularly, the present disclosure relates to a fastening device installing method and an installing hole forming mechanism for installing a fastening device to a shoe.

Description of Related Art

In general, a shoe has a first side, a second side corresponding to the first side, and a tongue located between the first side and the second side. The shoe can further include a plurality of eyelets arranged at the first side and the second side. A conventional shoe lace can pass through the eyelets and can be knotted such that the shoe can be tightened.

However, the conventional shoe lace has to be released before taking off the shoe, and has to be knotted again when wearing the shoe, which brings a lot of inconvenience. In order to solve the problem, a fastening device is developed. The fastening device positioned on the tongue can include a lace which can pass through the eyelets to be served as the conventional shoe lace. By operating the fastening device, the lace can be released and tightened quickly; as a result, it is easy to wear or take off the shoe.

Unfortunately, the fastening device has to be fixed on the tongue in a post-process in the factory. In other words, it is not easy for a user to couple a fastening device to his/her own shoe which does not be designed with the fastening device.

Based on the abovementioned problem, how to allow the fastening device to be easily coupled to any shoe becomes a pursuit target for practitioners.

SUMMARY

One aspect of the present disclosure is to provide an installing hole forming mechanism including at least one guiding sleeve and an inserting set. The at least one guiding sleeve includes a bore. The inserting set is detachably coupled to the at least one guiding sleeve and includes at least one spike configured to couple to the bore of the at least one guiding sleeve. The at least one spike includes a tip. When the at least one spike passes through the bore of the at least one guiding sleeve, the tip exposes from the guiding sleeve, and the at least one spike and the at least one guiding sleeve are forced to puncture a shoe such that at least one installing hole is formed on the shoe.

Another aspect of the present disclosure is to provide a fastening device installing method which is configured to install a fastening device to a shoe. The fastening device installing method includes an installing hole forming step and a fastening device limiting step. In the installing hole forming step, at least one spike is forced to puncture a shoe, thereby forming at least one installing hole on the shoe. In the fastening device limiting step, the fastening device is coupled to the at least one installing hole such that the fastening device is limited on the shoe.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other element, or it can be indirectly disposed on, connected or coupled to the other element, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
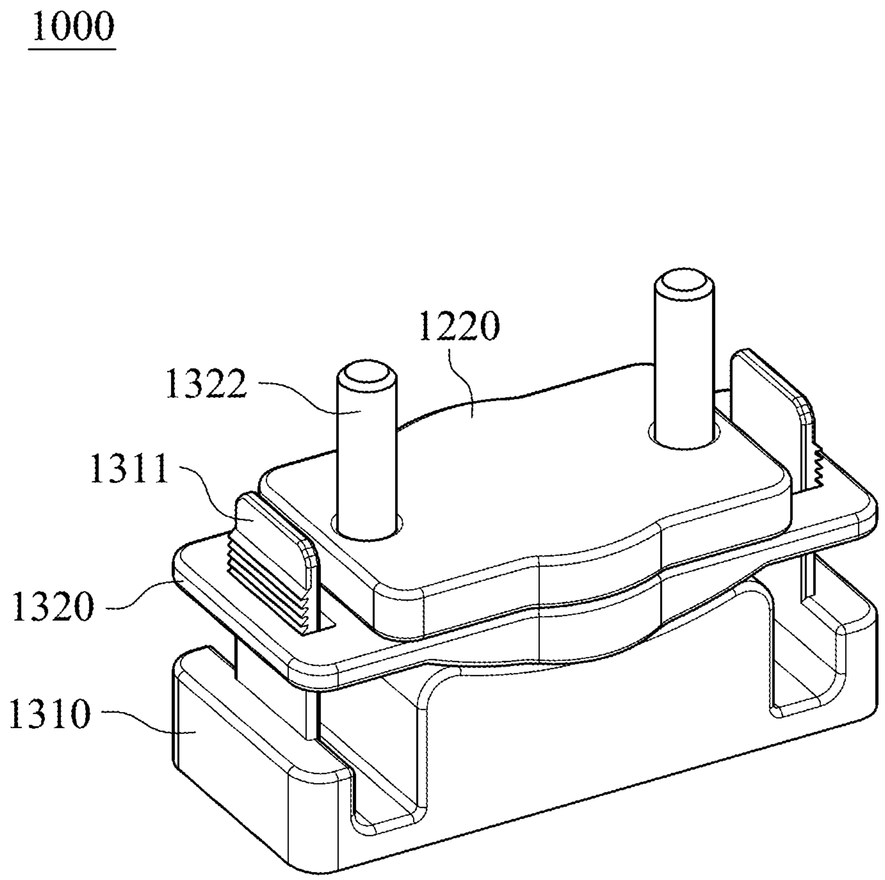
FIG. 1 is a three dimensional schematic view showing an installing hole forming mechanism of a first embodiment of the present disclosure.
Figure 2:
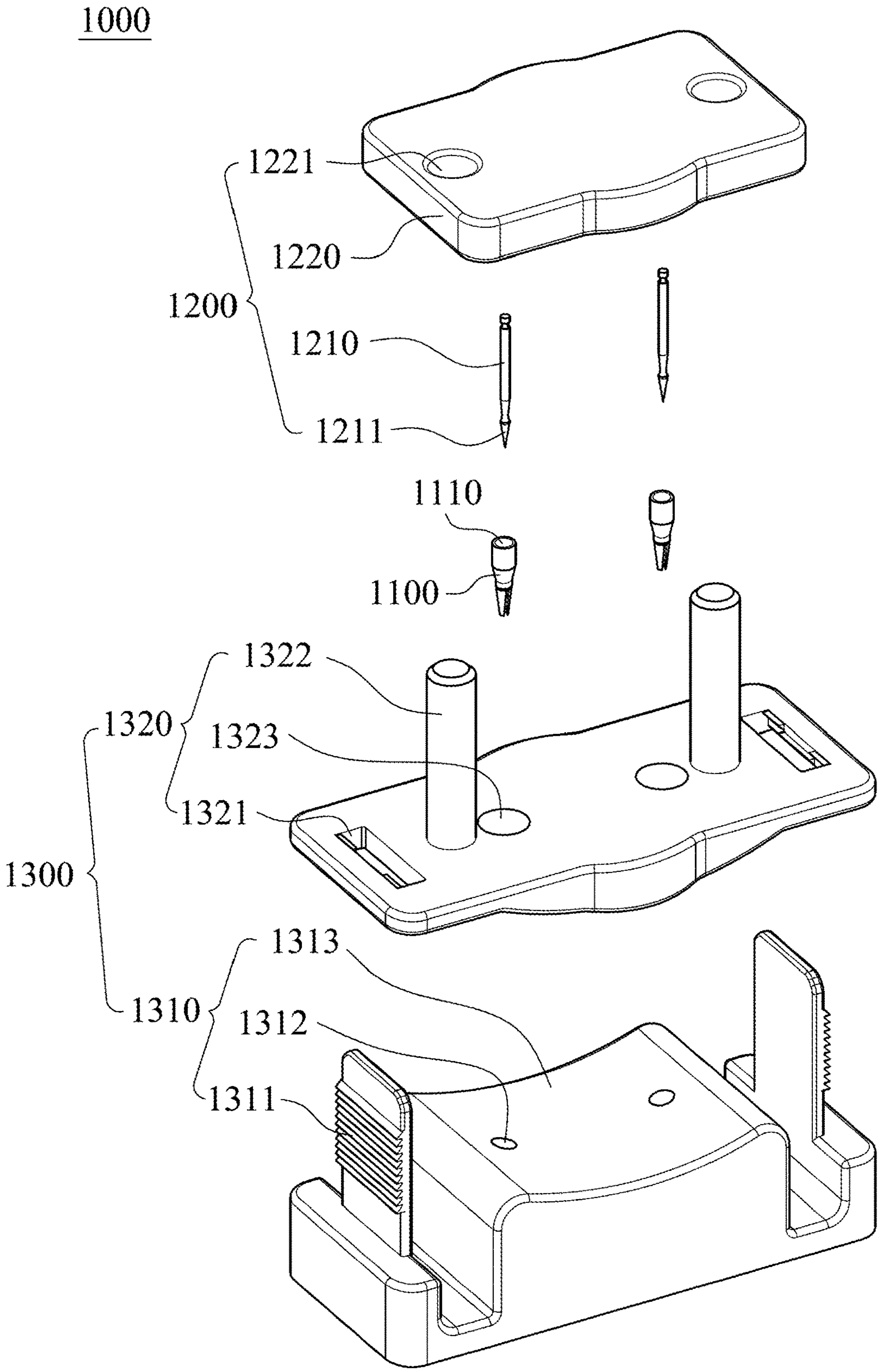
FIG. 2 is an exploded view showing the installing hole forming mechanism of the first embodiment.

FIG. 1 is a three dimensional schematic view showing an installing hole forming mechanism 1000 of a first embodiment of the present disclosure. FIG. 2 is an exploded view showing the installing hole forming mechanism 1000 of the first embodiment. The installing hole forming mechanism 1000 includes at least one guiding sleeve 1100 and an inserting set 1200. The at least one guiding sleeve 1100 includes a bore 1110. The inserting set 1200 is detachably coupled to the at least one guiding sleeve 1100 and includes at least one spike 1210 configured to couple to the bore 1110 of the at least one guiding sleeve 1100. The at least one spike 1210 includes a tip 1211. When the at least one spike 1210 passes through the bore 1110 of the at least one guiding sleeve 1100, the tip 1211 exposes from the guiding sleeve 1100, and the at least one spike 1210 and the at least one guiding sleeve 1100 are forced to puncture a shoe S1 (shown in FIG. 3) such that at least one installing hole H1 (shown in FIG. 5) is formed on the shoe S1.

Therefore, the installing hole H1 can be formed on the shoe S1 by the spike 1210, and the guiding sleeve 1100 can be disposed within the installing hole H1 by lead of the spike 1210, which facilities installation of a fastening device R1 (shown in FIG. 6) in the latter process.

In use, the installing hole forming mechanism 1000 can be applied to any parts of a shoe S1, e.g., a tongue S11 (shown in FIG. 3), to form the installing hole H1, and the fastening device R1 which is coupled to a lace can be positioned on the shoe S1 via the installing hole H1, thereby forming a fastening system for tightening the shoe S1.

In the first embodiment, a number of the at least one spike 1210 is two. A number of the at least one guiding sleeve 1100 can correspond to the spikes 1210 and can also be two. Hence, two installing holes H1 which are spaced from each other can be formed on the shoe S1, and the installation reliability of the fastening device R1 can be increased. The present disclosure is not limited thereto.

Figure 3:
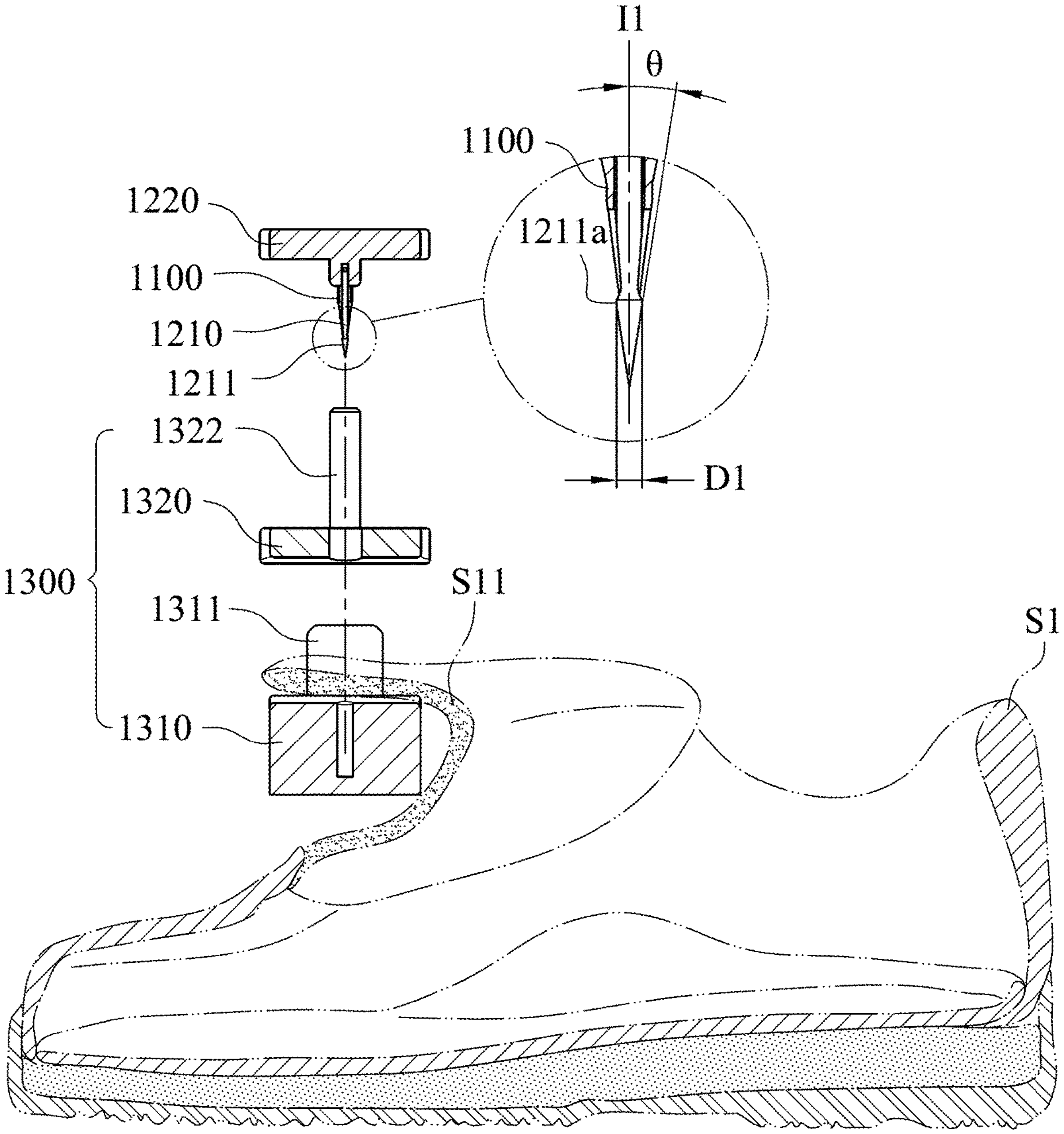
FIG. 3 is a cross-sectional view showing the installing hole forming mechanism of the first embodiment applied to a shoe.
Figure 4:
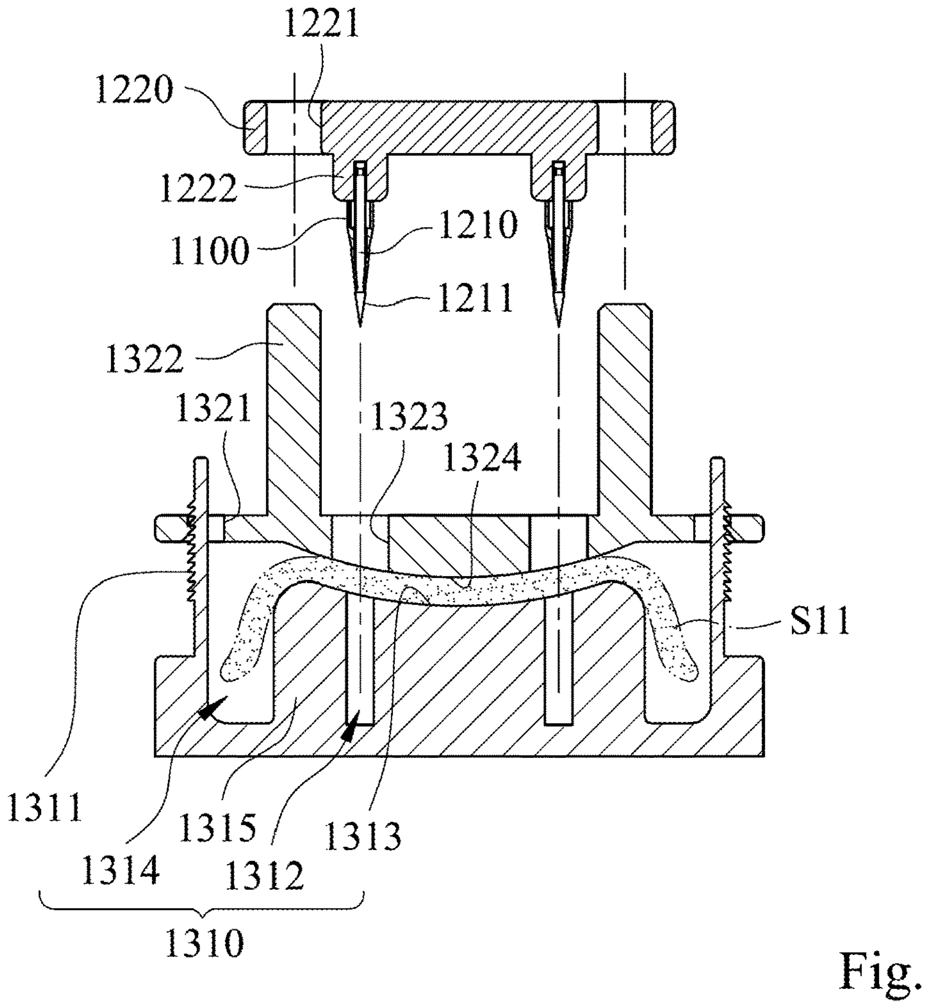
FIG. 4 is one front-sectional view showing the installing hole forming mechanism of the first embodiment positioned onto to a tongue of the shoe.

FIG. 3 is a cross-sectional view showing the installing hole forming mechanism 1000 of the first embodiment applied to the shoe S1. FIG. 4 is one front-sectional view showing the installing hole forming mechanism 1000 of the first embodiment positioned onto to the tongue S11 of the shoe S1. Please refer to FIGS. 3 and 4 with reference to FIG. 2, the installing hole forming mechanism 1000 can further include a restricting set 1300 detachably coupled to the tongue S11 of the shoe S1, and the inserting set 1200 can insert into the restricting set 1300 to form the installing holes H1 on the tongue S11. Therefore, the tongue S11 can be positioned first to facilitate puncture of the inserting set 1200.

To be more specific, the shoe S1 includes an upper side and a lower side. The restricting set 1300 can include a bearing seat 1310 and a pressing seat 1320. The bearing seat 1310 is located at one of the upper side and the lower side, and the bearing seat 1310 includes two first engaging portions 1311. The pressing seat 1320 is located at the other one of the upper side and the lower side. The pressing seat 1320 is detachably coupled to the bearing seat 1310 and includes two second engaging portions 1321 engaged with the two first engaging portions 1311, respectively, such that the tongue S11 is limited between the bearing seat 1310 and the pressing seat 1320. Each of the first engaging portions 1311 can have a toothed belt structure, and each of the second engaging portions 1321 can have a hole structure.

The bearing seat 1310 can include a central convex portion 1315 and two receiving grooves 1314. The two receiving grooves 1314 are located at two opposite sides of the central convex portion 1315. Each of the first engaging portions 1311 can be located at an outer side of each of the receiving grooves 1314, and when the tongue S11 is positioned on the bearing seat 1310, parts of the tongue S11 which exceed the central convex portion 1315 can be received in the two receiving grooves 1314 if the width of the tongue S11 is longer than the width of the central convex portion 1315, and the bearing seat 1310 can be applied to tongues with different widths.

The pressing seat 1320 has a board body (not labeled). Each of the two second engaging portions 1321 has a through hole structure which totally penetrates the board body. Hence, each of the second engaging portions 1321 is configured to allow each of the first engaging portions 1311 to insert thereinto. Moreover, adjustment of the gap between the pressing seat 1320 and the bearing seat 1310 to press and position the tongue S11 is allowed owing to the toothed belt structure of the first engaging portion 1311; correspondingly, there is an advantage of applying the restricting set 1300 to any tongue S11 with different thickness. The bearing seat 1310 can further include an upper arched surface 1313, and the pressing seat 1320 can further include a lower arched surface 1324 coordinated with the upper arched surface 1313 to allow the tongue S11 to be firmly held. The present disclosure is not limited thereto.

In order to be easily forced by the user, the inserting set 1200 can further include a cap 1220. The cap 1220 connects to the spikes 1210 and includes two positioning holes 1221. The two positioning holes 1221 are spaced from each other. The pressing seat 1320 is located between the cap 1220 and the bearing seat 1310 and further includes two positioning posts 1322 configured for inserting into the two positioning holes 1221, respectively. The bearing seat 1310 can further include two guiding channels 1312 configured to guide the spikes 1210. Hence, when the cap 1220 and the spikes 1210 are pressed to move toward the pressing seat 1320, the two positioning posts 1322 can insert into the two positioning holes 1221, respectively, and the cap 1220 can be guided and tilt thereof can be avoided, which also facilitates alignment of the spikes 1210. After the spikes 1210 puncturing the tongue S11, the spikes 1210 can insert into the guiding channels 1312; as a result, in addition to assistance of alignment, the guiding channels 1312 can prevent the spikes 1210 from hurting the user.

The cap 1220 can include two protrusions 1222, and each of the two protrusions 1222 protrudes toward the pressing seat 1320 and is configured for each of the two spikes 1210 to be disposed thereon. The pressing seat 1320 can further include two through holes 1323 for the two protrusions 1222 to insert thereinto. Each of the through holes 1323 can communicate with each of the guiding channels 1312.

Figure 5:
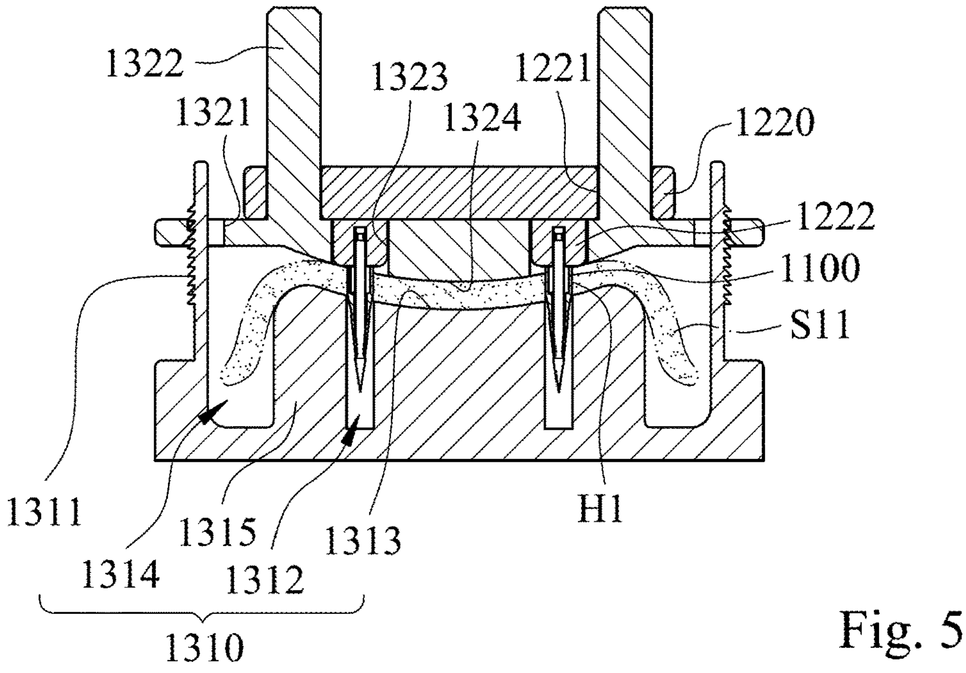
FIG. 5 is another front-sectional view showing the installing hole forming mechanism of the first embodiment positioned onto the tongue of the shoe.

FIG. 5 is another front-sectional view showing the installing hole forming mechanism 1000 of the first embodiment positioned onto the tongue S11 of the shoe S1. Please refer to FIG. 5 with reference to FIGS. 2 to 4. The user can put the bearing seat 1310 on the upper side of the shoe S1 first, and then turn the tongue S11 upside down and put it on the bearing seat 1310, as shown in FIG. 3. Subsequently, the user can use the pressing seat 1320 to press the tongue S11. In other words, the tongue S11 is located between the pressing seat 1320 and the bearing seat 1310, as shown in FIG. 4. Before puncturing, the spike 1210 can be assembled to the cap 1220 in advance, and the guiding sleeve 1100 sleeves on the spike 1210. When the cap 1220 is forced by a force to move downward, the cap 1220 will be guided by the positioning posts 1322 and the spike 1210 can insert into the through hole 1323 to allow the tip 1211 to puncture the tongue S11, and since the force is not removed, the spike 1210 and the guiding sleeve 1100 will keep going into the guiding channel 1312 until the two protrusions 1222 totally insert into the two through holes 1323, as shown in FIG. 5. Thus, the installing hole H1 is formed.

Moreover, as shown in FIG. 3, the tip 1211 can have a cone structure, and the tip 1211 has a maximum diameter D1 of 1 mm to 5 mm. In addition, the tip 1211 has a cone surface 1211*a*. An angle θ is contained between the cone surface 1211*a* and a central axis I1 of the spike 1210, and the angle θ is in a range of 1 degree to 45 degrees. The spike 1210 can puncture the tongue S11 smoothly as long as the conditions are satisfied. Moreover, the spike 1210 can include a neck portion (not labeled), and a minimum diameter of the neck portion is smaller than the maximum diameter D1 of the spike 1210; consequently, when the spike 1210 passes through the guiding sleeve 1100, an edge of the guiding sleeve 1100 can rest on the neck portion, and the tip 1211 can expose from the guiding sleeve 1100.

Figure 6:
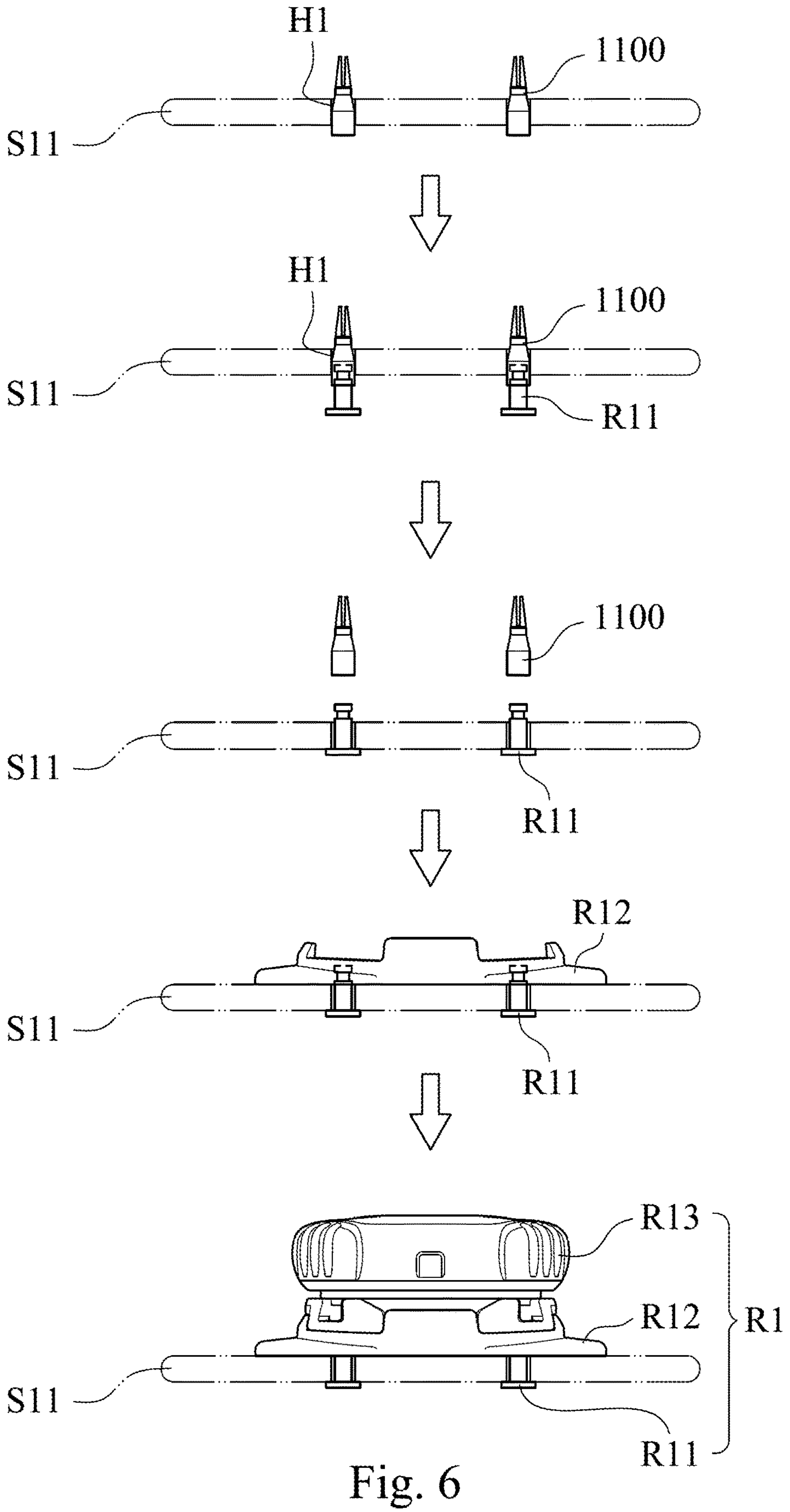
FIG. 6 is an illustration showing that a fastening device is coupled to an installing hole formed by the installing hole forming mechanism of the first embodiment.

FIG. 6 is an illustration showing that the fastening device R1 is coupled to the installing hole H1 formed by the installing hole forming mechanism 1000 of the first embodiment. After the installing hole H1 is formed, only the guiding sleeve 1100 is remained in the installing hole H1, and as shown in FIG. 6, the tongue S11 can be turned to face upward. An engaging pin R11 of the fastening device R1 can insert into the bore 1110 of the guiding sleeve 1100, and through the configuration of the inner diameter of the guiding sleeve 1100 and the outer diameter of the engaging pin R11, the guiding sleeve 1100 is pushed by the engaging pin R11 and leaves the installing hole H1 when the engaging pin R11 inserts into the guiding sleeve 1100. In other words, the engaging pin R11 is substituted for the guiding sleeve 1100 to be located inside the installing hole H1.

Then, a bracket R12 of the fastening device R1 is connected to the engaging pin R11, and a reel member R13 of the fastening device R1 is coupled to the bracket R12. Thus, the fastening device R1 can be positioned on the tongue S11. Please be noted that the illustration shown in FIG. 6 is exemplary, and the present disclosure is not limited thereto.

Figure 7:
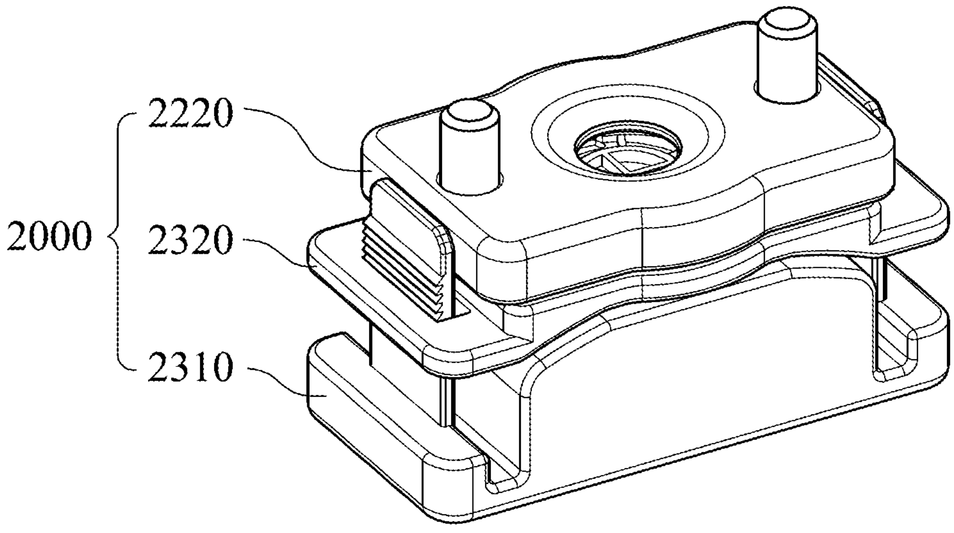
FIG. 7 is a three dimensional schematic view showing an installing hole forming mechanism of a second embodiment and a bracket of the present disclosure.
Figure 8:
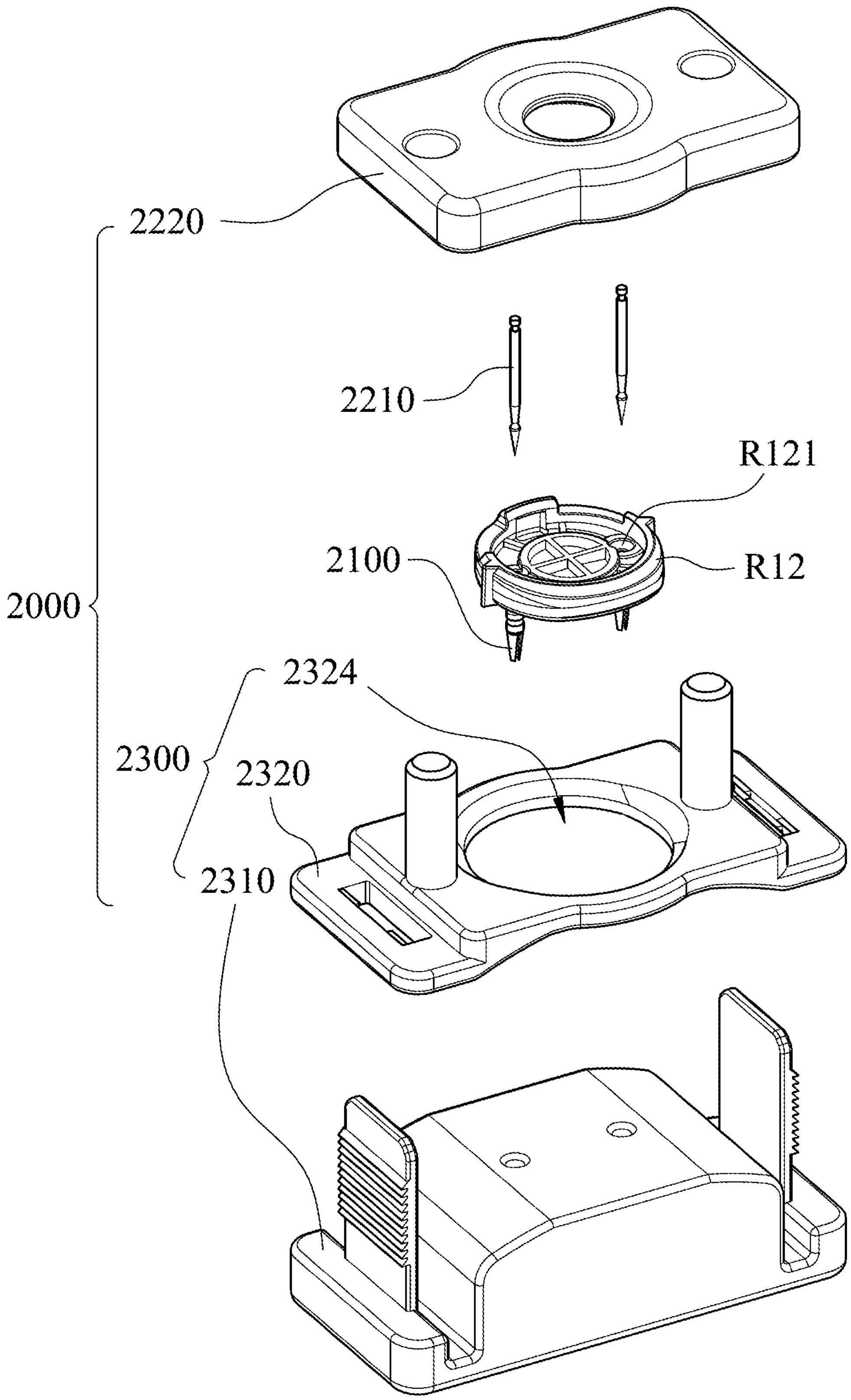
FIG. 8 is an exploded view showing the installing hole forming mechanism of the second embodiment and the bracket.

FIG. 7 is a three dimensional schematic view showing an installing hole forming mechanism 2000 of a second embodiment and a bracket R12 of the present disclosure. FIG. 8 is an exploded view showing the installing hole forming mechanism 2000 of the second embodiment and the bracket R12. The installing hole forming mechanism 2000 is similar to the installing hole forming mechanism 1000 of the first embodiment, and only the differences will be described hereafter.

The pressing seat 2320 of the restricting set 2300 can include a receiving hole 2324, and the receiving hole 2324 is located in the center region of the pressing seat 2320 and totally penetrates the board body of the pressing seat 2320. The bracket R12 can be coupled to the guiding sleeve 2100 in advance, and the bracket R12 is provided to include two apertures R121 communicating with the bore (not labeled) of the guiding sleeve 2100.

Figure 9:
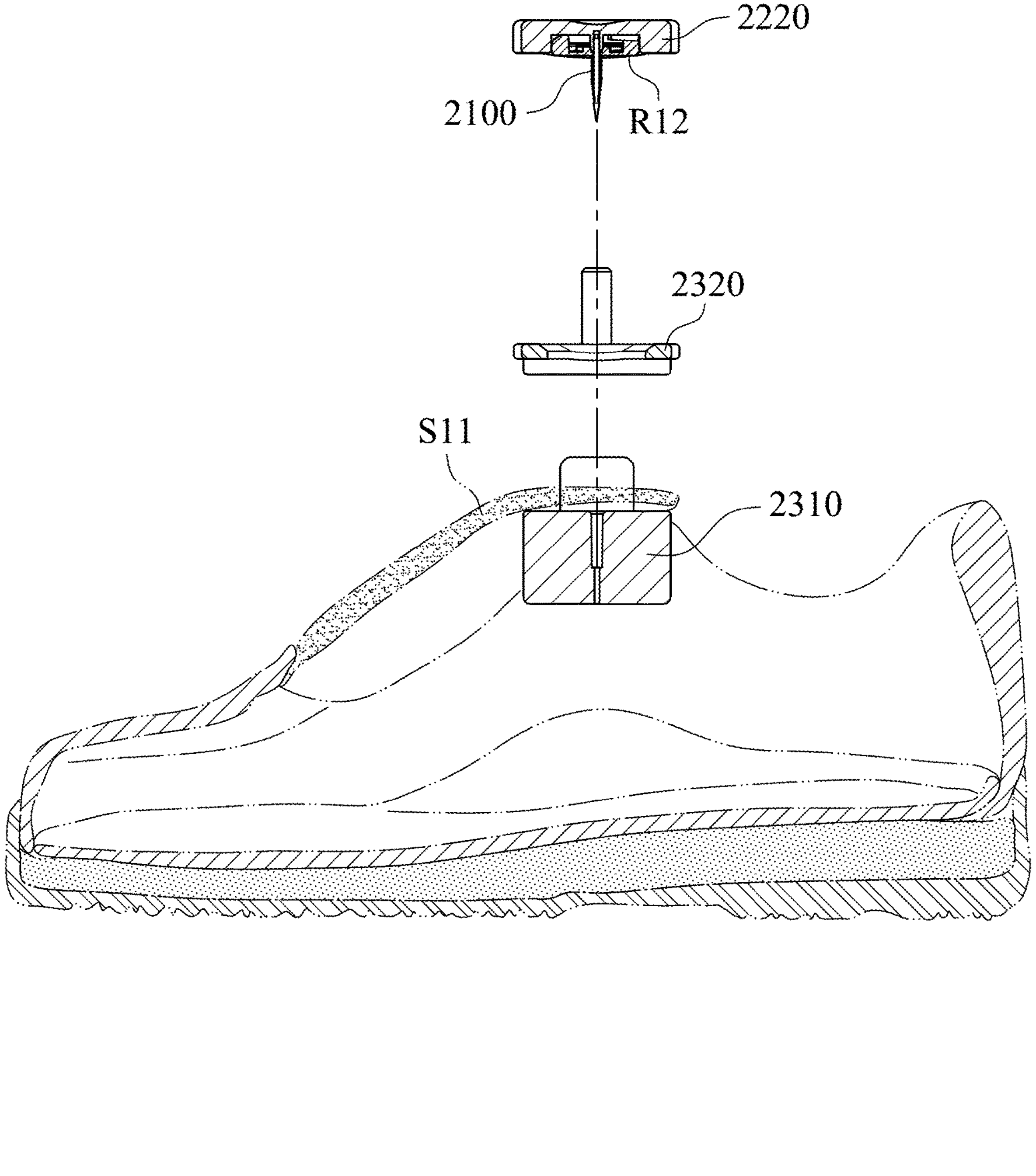
FIG. 9 is a cross-sectional view showing the installing hole forming mechanism of the second embodiment and the bracket applied to a tongue.

FIG. 9 is a cross-sectional view showing the installing hole forming mechanism 2000 of the second embodiment and the bracket R12 applied to a tongue S11. Please refer to FIG. 9 with reference to FIG. 8. The bearing seat 2310 can be put inside the shoe S1 and can be located at the lower side of the tongue S11. The pressing seat 2320 can be coupled to the bearing seat 2310 to press and position the tongue S11. Before puncturing, the spike 2210 can pass through the aperture R121 to couple to the guiding sleeve 2100, and the bracket R12 can be positioned on the cap 2220. After puncturing, the bracket R12 will correspondingly insert into the receiving hole 2324 of the pressing seat 2320.

Figure 10:
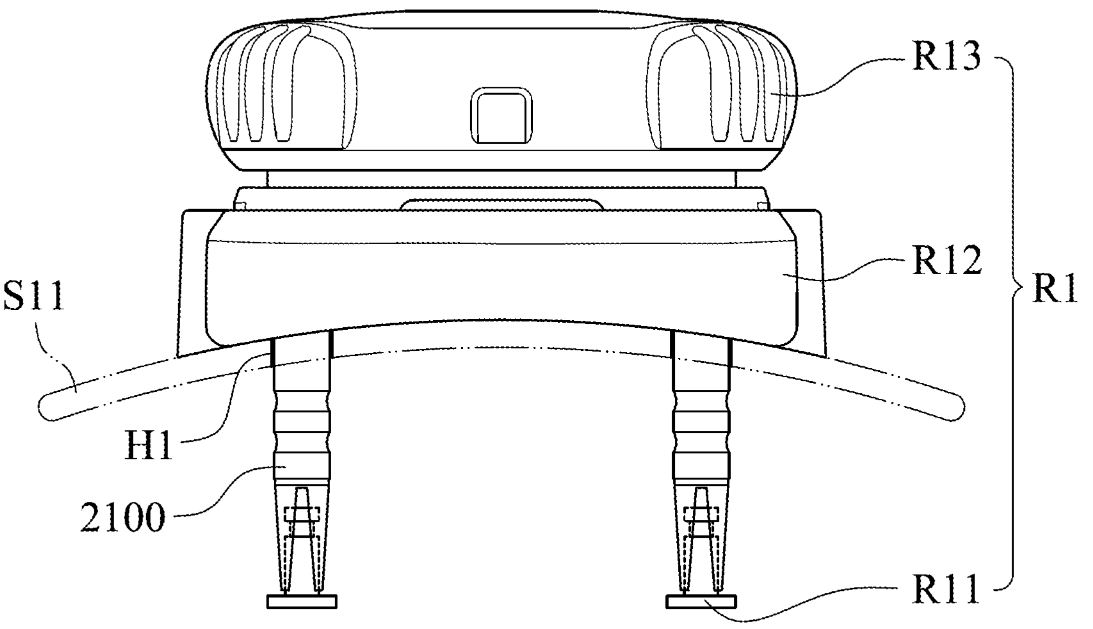
FIG. 10 is an illustration showing that a fastening device is coupled to an installing hole formed by the installing hole forming mechanism of the second embodiment.

FIG. 10 is an illustration showing that a fastening device R1 is coupled to an installing hole H1 formed by the installing hole forming mechanism 2000 of the second embodiment. Since the bracket R12 is coupled to the guiding sleeve 2100 in advance, there is no necessary to remove the guiding sleeve 2100 as shown in FIG. 6. Instead, the engaging pin R11 can be engaged with the guiding sleeve 2100 directly to allow the bracket R12 to be limited on the tongue S11. Then the reel member R13 can be coupled to the bracket R12 to complete the installation of the fastening device R1.

Figure 11:
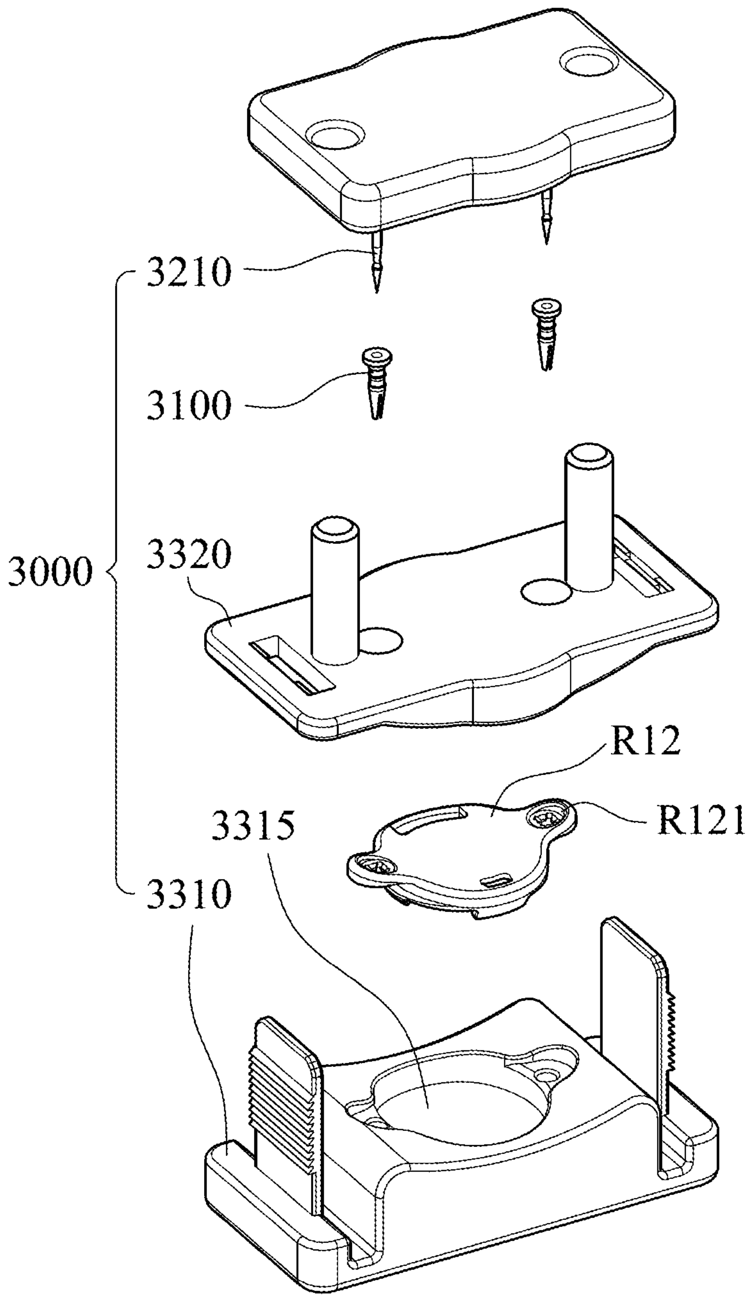
FIG. 11 is one exploded view showing an installing hole forming mechanism of a third embodiment and a bracket of the present disclosure.
Figure 12:
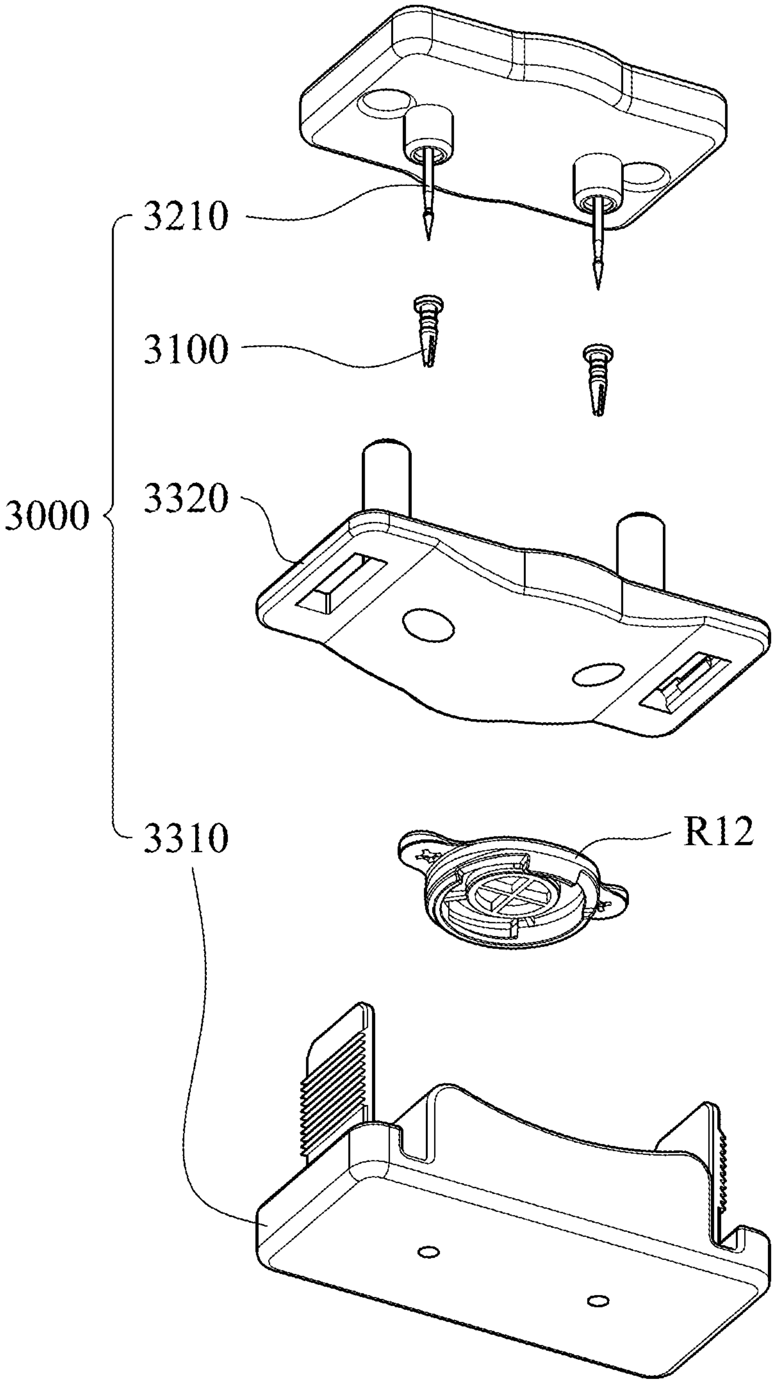
FIG. 12 is another exploded view showing the installing hole forming mechanism of the third embodiment and the bracket.

FIG. 11 is one exploded view showing an installing hole forming mechanism 3000 of a third embodiment and a bracket R12 of the present disclosure. FIG. 12 is another exploded view showing the installing hole forming mechanism 3000 of the third embodiment and the bracket R12. The installing hole forming mechanism 3000 is similar to the installing hole forming mechanism 2000 of the second embodiment, but the bearing seat 3310 can include a receiving hole 3315 located at the central convex portion (not labeled) of the bearing seat 3310. The shape of the receiving hole 3315 corresponds to the bracket R12. Other details similar to the second embodiment will not be described again.

Figure 13:
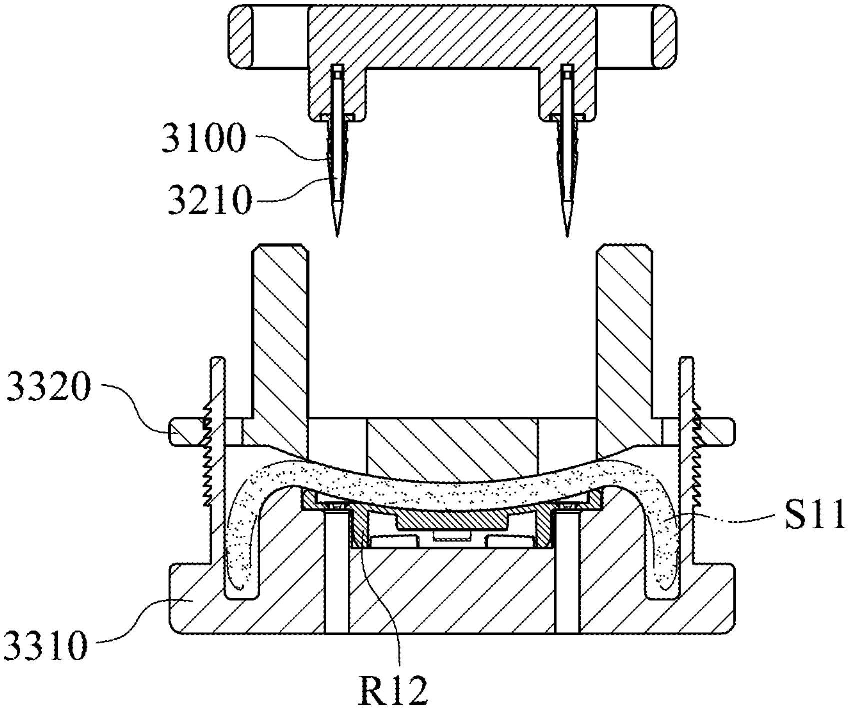
FIG. 13 is one front-sectional view showing the installing hole forming mechanism of the third embodiment and the bracket applied to a tongue.
Figure 14:
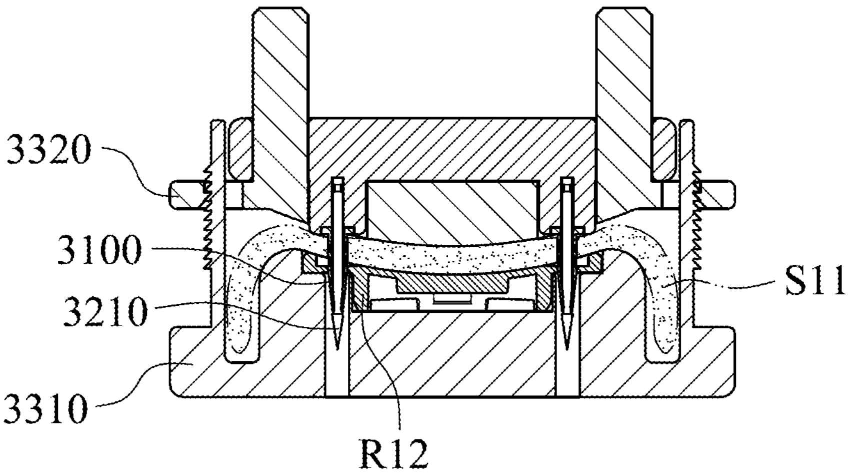
FIG. 14 is another front-sectional view showing the installing hole forming mechanism of the third embodiment and the bracket applied to the tongue.

FIG. 13 is one front-sectional view showing the installing hole forming mechanism 3000 of the third embodiment and the bracket R12 applied to a tongue S11. FIG. 14 is another front-sectional view showing the installing hole forming mechanism 3000 of the third embodiment and the bracket R12 applied to the tongue S11. Please refer to FIGS. 13 and 14 with reference to FIGS. 11 to 12. Before puncturing, the bracket R12 can be inverted and be put inside the receiving hole 3315, as shown in FIG. 13. The pressing seat 3320 can be disposed at the upper side of the tongue S11 and then be coupled to the bearing seat 3310 to hold the tongue S11. Subsequently, as shown in FIG. 14, the spike 3210 with the guiding sleeve 3100 will puncture the tongue S11 and pass through the aperture R121 of the bracket R12 such that the guiding sleeve 3100 is coupled to the bracket R12.

Figure 15:
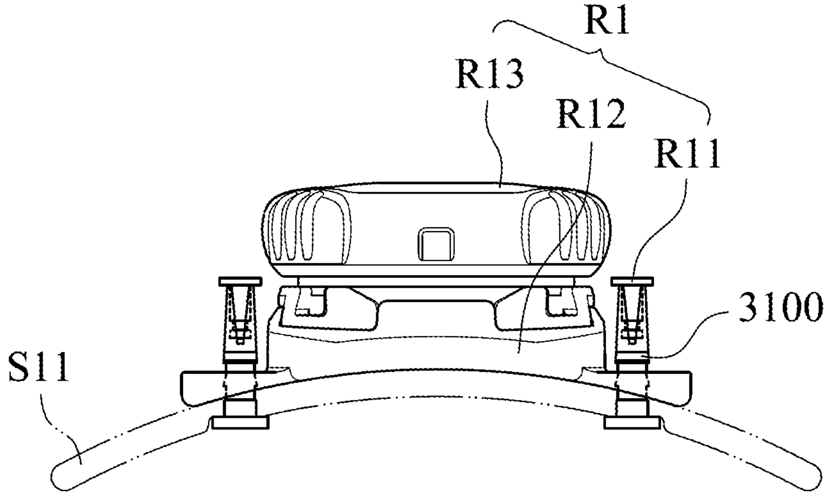
FIG. 15 is an illustration showing that a fastening device is coupled to an installing hole formed by the installing hole forming mechanism of the third embodiment.

FIG. 15 is an illustration showing that a fastening device R1 is coupled to an installing hole formed by the installing hole forming mechanism 3000 of the third embodiment. Since the bracket R12 is coupled to the guiding sleeve 3100 in advance, there is no necessary to remove the guiding sleeve 3100 as shown in FIG. 6. Instead, the engaging pin R11 can be engaged with the guiding sleeve 3100 directly to allow the bracket R12 to be limited on the tongue S11. Then the reel member R13 can be coupled to the bracket R12 to complete the installation of the fastening device R1.

Figure 16:
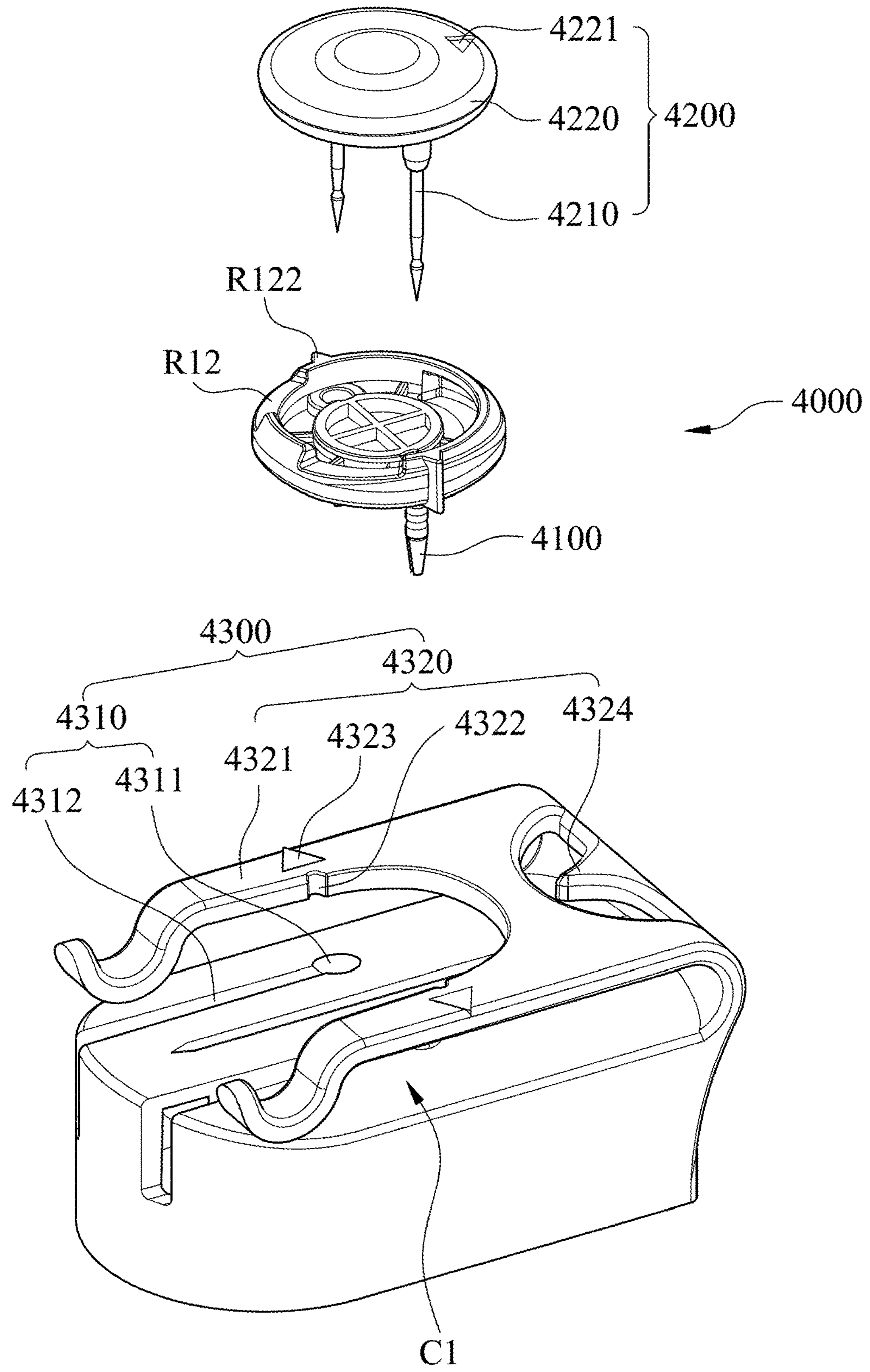
FIG. 16 is one exploded view showing an installing hole forming mechanism of a fourth embodiment and a bracket of the present disclosure.
Figure 17:
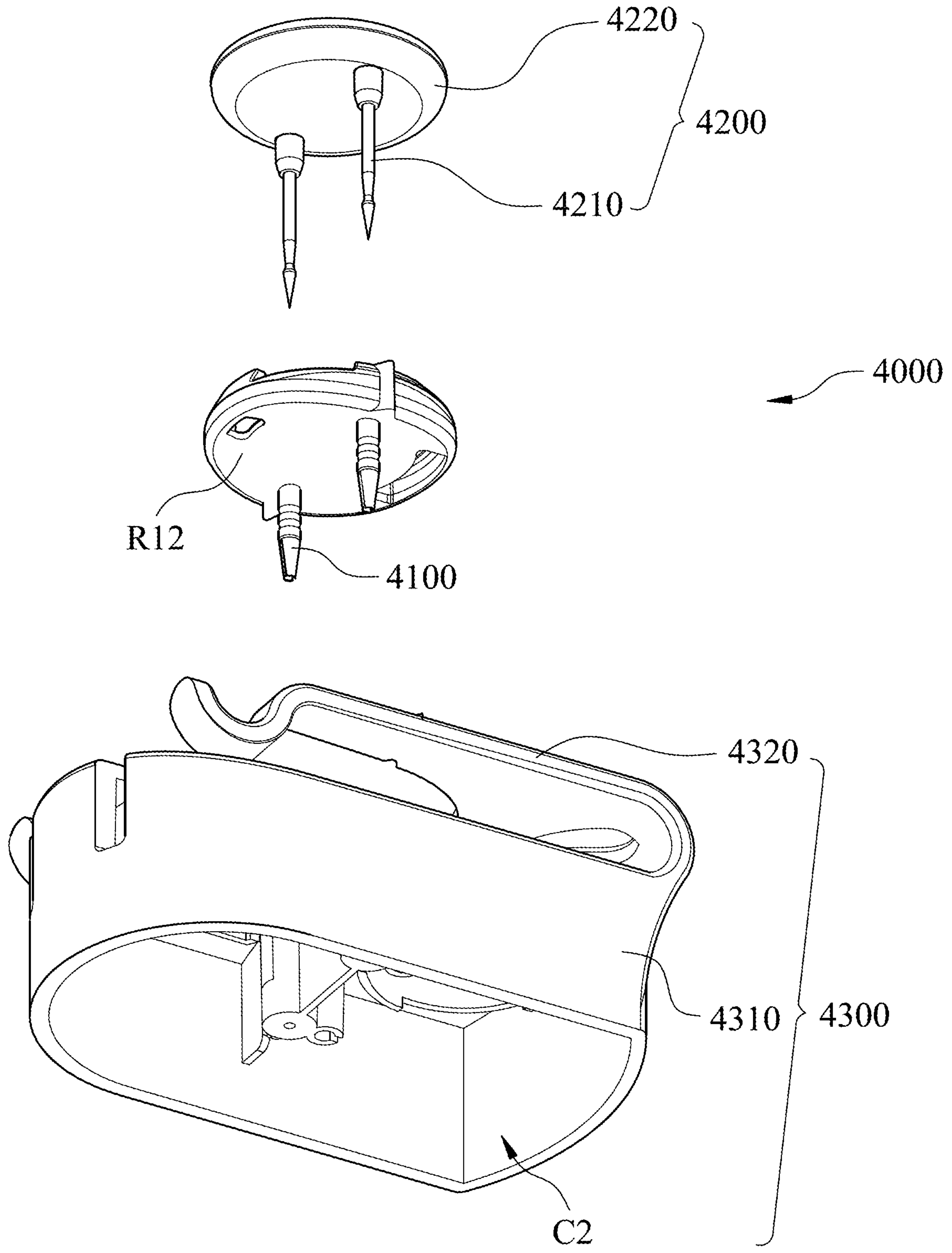
FIG. 17 is another exploded view showing the installing hole forming mechanism of the fourth embodiment and the bracket.
Figure 18:
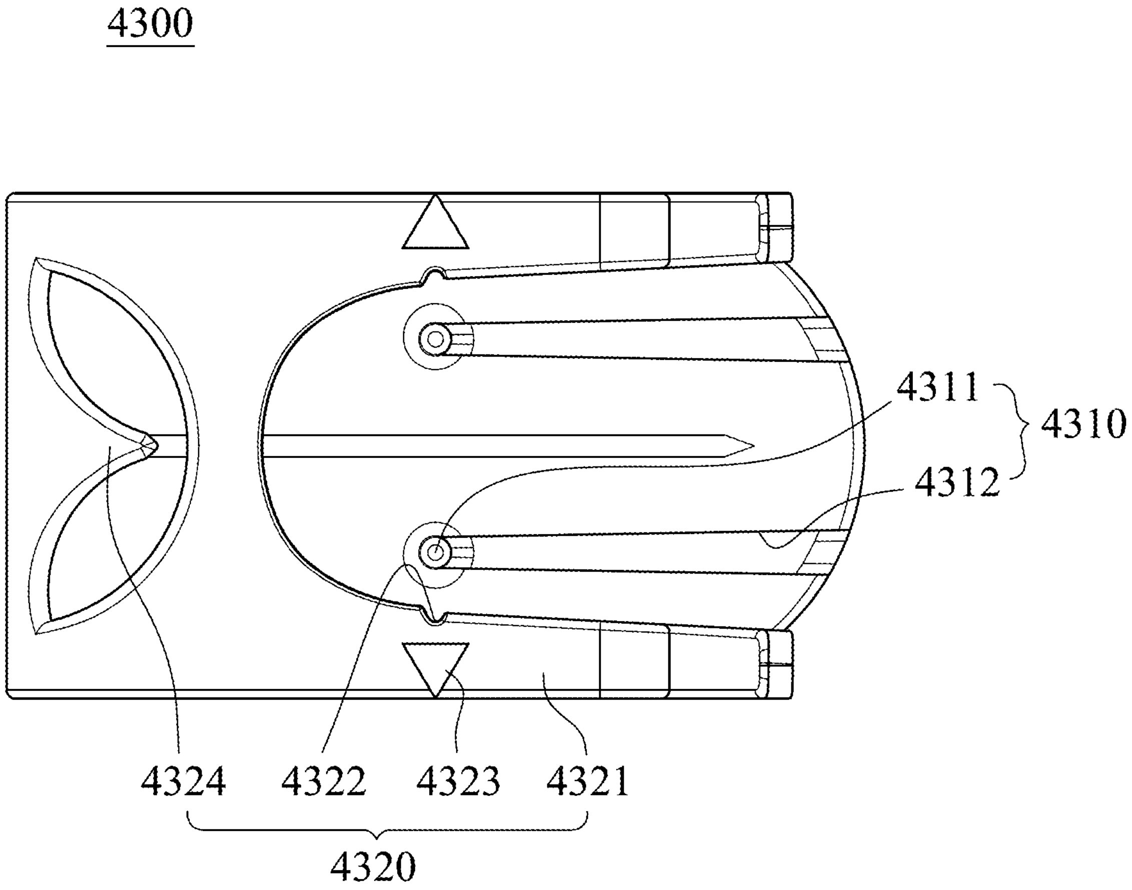
FIG. 18 is a top view showing a restricting set of the installing hole forming mechanism of the fourth embodiment.

FIG. 16 is one exploded view showing an installing hole forming mechanism 4000 of a fourth embodiment and a bracket R12 of the present disclosure. FIG. 17 is another exploded view showing the installing hole forming mechanism 4000 of the fourth embodiment and the bracket R12. FIG. 18 is a top view showing a restricting set 4300 of the installing hole forming mechanism 4000 of the fourth embodiment. The restricting set 4300 can include a main frame 4310 and a clip 4320, and the clip 4320 is connected to the main frame 4310 to form a clipping space C1 with the main frame 4310.

The main frame 4310 can include an inserted space C2, two openings 4311 and two slots 4312. Each of the openings 4311 communicates with the inserted space C2, and each of the slots 4312 communicates with each of the openings 4311 and the inserted space C2. Precisely, the main frame 4310 includes a top surface (not labeled) and a wall (not labeled), and the wall protrudes downward from the top surface to define the inserted space C2. The two openings 4311 are located on the top surface, and each of the slots 4312 extends from each of the openings 4311 to the wall.

The clip 4320 is connected to the top surface and includes two arms 4321, two inner indicators 4322, two lateral indicators 4323 and one medium indicator 4324. The two arms 4321 are spaced from each other. Each of the two inner indicators 4322 is located at an inner side of each of the arms 4321 and has a notch structure. Each of the two lateral indicators 4323 is located on a surface of each of the arms 4321 and is aligned with each of the inner indicators 4322. The medium indicator 4324 is aligned with a central axis of the clip 4320.

The bracket R12 can be coupled to the guiding sleeve 4100 in advance, and the bracket R12 can include two apertures (not labeled) communicating with the bore (not labeled) of the guiding sleeve 4100. As shown in FIG. 16, the bracket R12 can further include two ears R122. The cap 4220 is disk shaped and the size thereof corresponds to the bracket R12. The cap 4220 can further include a cap indicator 4221.

Figure 19:
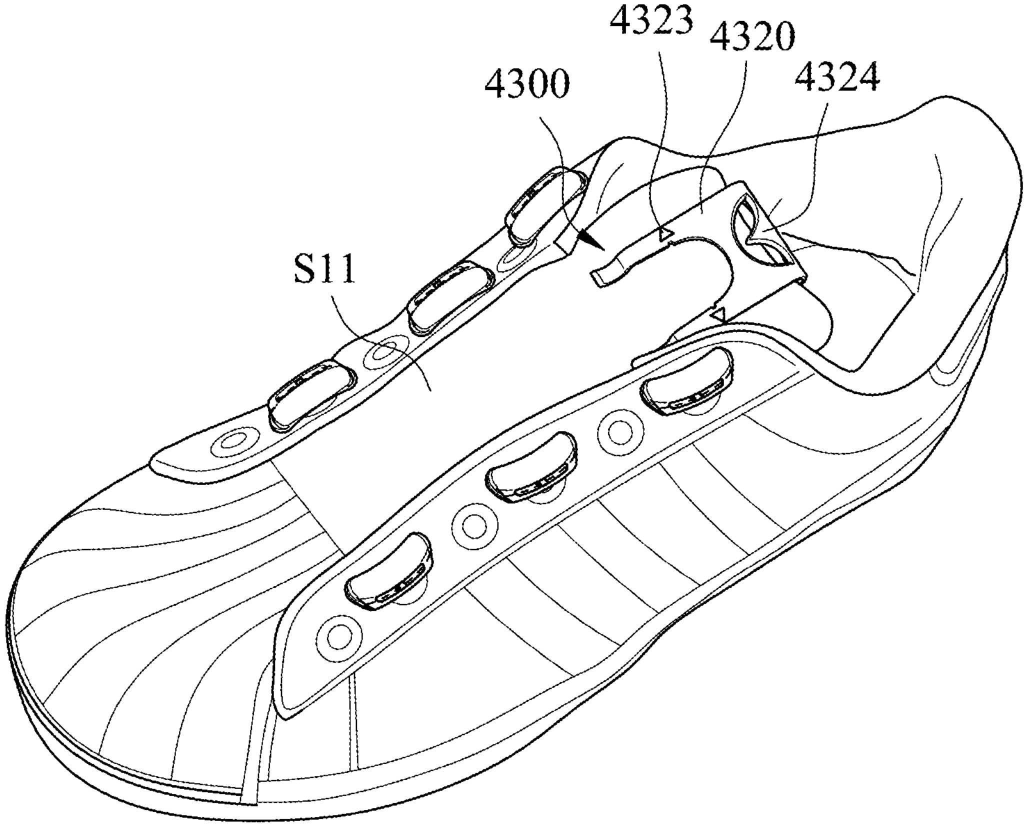
FIG. 19 is an illustration showing the restricting set of the installing hole forming mechanism of the fourth embodiment applied to position a tongue.

FIG. 19 is an illustration showing the restricting set 4300 of the installing hole forming mechanism 4000 of the fourth embodiment applied to position a tongue S11. Please refer to FIG. 19 with reference to FIGS. 16 to 18. Since the two arms 4321 of the clip 4320 are elastic, the arms 4321 can be deformed to allow the tongue S11 to go into the clipping space C1. Then the arms 4321 are restored to press and position the tongue S11. During positioning the tongue S11, the medium indicator 4324 can be aligned with a central axis of the tongue S11, and the two lateral indicators 4323 can be, but not limited to, used to align any of the eyelets of the shoe S1.

Figure 20:
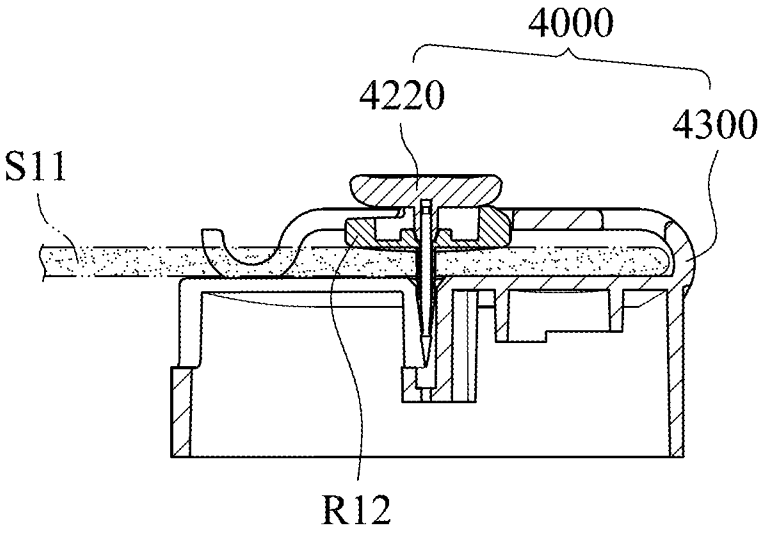
FIG. 20 is an illustration showing the installing hole forming mechanism of the fourth embodiment and the bracket for puncturing the tongue.

FIG. 20 is an illustration showing the installing hole forming mechanism 4000 of the fourth embodiment and the bracket R12 for puncturing the tongue S11. Please refer to FIG. 20 with reference to FIGS. 16 to 19. Before puncturing, the spike 4210 can pass through the aperture to couple to the guiding sleeve 4100 first, and the bracket R12 can be positioned on the cap 4220. Subsequently, the cap indicator 4221 is aligned with the medium indicator 4324, and the cap 4220 is forced to move toward the tongue S11. The spike 4210 will enter the inserted space C2 via the opening 4311 after puncturing the tongue S11. The bracket R12 can be pressed into a middle region between the two arms 4321 such that the two ears R122 are engaged with the two inner indicators 4322, respectively. Because each of the slots 4312 communicates with each of the openings 4311 and the inserted space C2, movement of the restricting set 4300 will not affect the spike 4210. The user can pull the restricting set 4300 back to remove the restricting set 4300 from the tongue S11, and only the bracket R12 and the inserting set 4200 are remained on the tongue S11.

Since the bracket R12 is coupled to the guiding sleeve 4100 in advance, there is no necessary to remove the guiding sleeve 4100 as shown in FIG. 6. Instead, the engaging pin R11 can be engaged with the guiding sleeve 4100, and then the bracket R12 and the reel member R13 are sequentially coupled thereto such that the installation of the fastening device R1 is completed.

Figure 21:
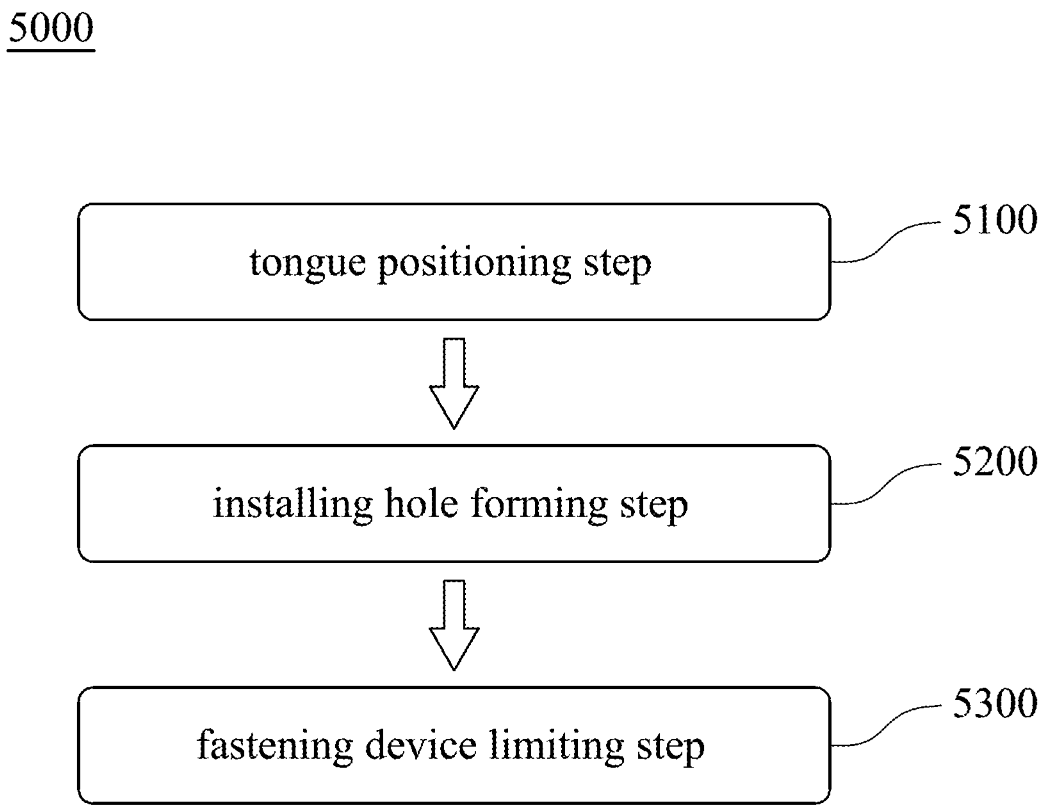
FIG. 21 is a flow chart showing a fastening device installing method of a fifth embodiment of the present disclosure.

FIG. 21 is a flow chart showing a fastening device installing method 5000 of a fifth embodiment of the present disclosure. Please refer to FIG. 21 with reference to FIGS. 1 to 10. The fastening device installing method 5000 is configured to install a fastening device R1 to a shoe S1. The fastening device installing method 5000 includes an installing hole forming step 5200 and a fastening device limiting step 5300.

In the installing hole forming step 5200, the spike 1210 or 2210 is forced to puncture the shoe S1, thereby forming the installing hole H1 on the shoe S1. To be more specific, the spike 1210 or 2210 inserts into the bore 1110 of the guiding sleeve 1100 or the bore of the guiding sleeve 2100, and the tip 1211 of the spike 1210 or the tip of the spike 2210 exposes from the guiding sleeve 1100 or 2100. Subsequently, the spike 1210 with the guiding sleeve 1100 or the spike 2210 with the guiding sleeve 2100 are forced to puncture the shoe S1.

In the fastening device limiting step 5300, the fastening device R1 is coupled to the installing hole H1 such that the fastening device R1 is limited on the shoe S1.

The fastening device installing method 5000 can further include a tongue positioning step 5100. The restricting set 1300 or 2300 is provided to couple to a tongue S11 of the shoe S1 for positioning the tongue S11, and the tongue positioning step 5100 is executed before the installing hole forming step 5200. To be more specific, in the tongue positioning step 5100, a bearing seat 1310 or 2310 is positioned at one of the upper side and the lower side of the tongue S11. The pressing seat 1320 or 2320 is located at the other one of the upper side and the lower side of the tongue S11 to couple to the bearing seat 1310 or 2310 such that the tongue S11 is limited between the bearing seat 1310 and the pressing seat 1320 or between the bearing seat 2310 and the pressing seat 2320.

As shown in FIG. 3, the pressing seat 1320 or 2320 can be put on the upper side of the tongue S11 (the side far from the inner region of the shoe S1) first, or, as shown in FIG. 9, the bearing seat 2310 can be put on the lower side of the tongue S11 (the side facing toward the inner region of the shoe S1), and the pressing seat 1320 or 2320 is aligned with the bearing seat 1310 or 2310. The first engaging portion 1311 will insert into the second engaging portion 1321, and the gap between the pressing seat 1320 and the bearing seat 1310 can be adjusted through the toothed belt structure of the first engaging portion 1311, thereby being firmly fixed the tongue S11. After the tongue S11 is fixed, the installing hole forming step 5200 can be executed.

As shown in FIG. 4, in the installing hole forming step 5200, the guiding sleeve 1100 sleeves on the spike 1210, and the user can press the cap 1220 toward the tongue S11 to allow the spike 1210 to puncture the tongue S11 such that the installing hole H1 is formed.

In addition, in the fastening device limiting step 5300, the fastening device R1 can include the bracket R12 and the reel member R13. The bracket R12 is coupled to the installing hole H1, and then the reel member R13 is coupled to the bracket R12.

As shown in FIGS. 7 to 10, since the bracket R12 is coupled to the guiding sleeve 2100 in advance, the engaging pin R11 can be engaged with the guiding sleeve 2100 such that the bracket R12 is coupled to the installing hole H1 and is limited on the tongue S11. Subsequently, the reel member R13 is coupled to the bracket R12 to complete the installation of the fastening device R1.

Or, optionally, as shown in FIG. 6, in the installing hole forming step 5200, the spike 1210 can be removed from the guiding sleeve 1100 while the guiding sleeve 1100 is remained in the installing hole H1. In the fastening device limiting step 5300, the engaging pin R11 is provided to insert into the guiding sleeve 1100, and the guiding sleeve 1100 is pushed by the engaging pin R11 and leaves the installing hole H1. Then, the engaging pin R11 is received in the installing hole H1, and the bracket R12 is allowed to couple to the engaging pin R11.

Precisely, after removing the spike 1210, only the guiding sleeve 1100 is remained in the installing hole H1. Then the engaging pin R11 can insert into the guiding sleeve 1100. The engaging pin R11 is forced to push the guiding sleeve 1100 to allow the guiding sleeve 1100 to be removed from the installing hole H1; as a result, the engaging pin R11 can be received in the installing hole H1. Subsequently, the bracket R12 can be coupled to the engaging pin R11, and the reel member R13 can be positioned on the tongue S11 via the bracket R12.

Figure 22:
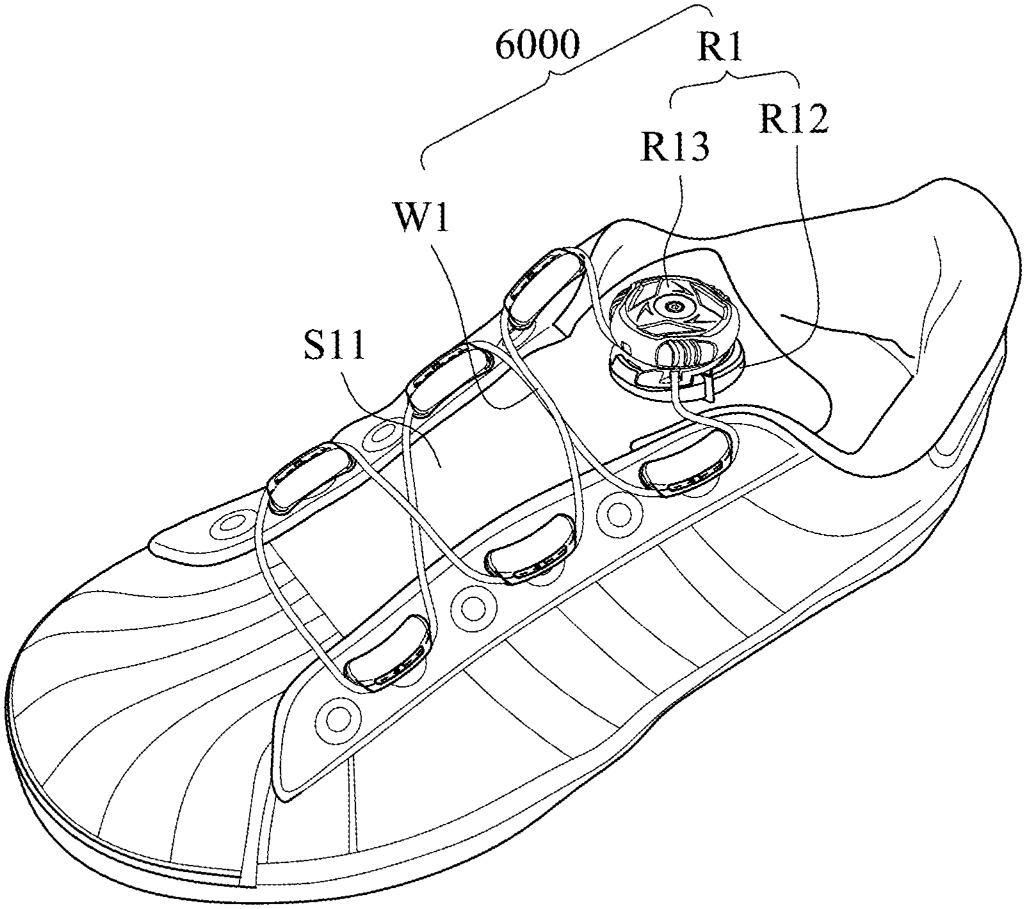
FIG. 22 is an illustration showing a fastening system completed by the fastening device installing method of the fifth embodiment.

FIG. 22 is an illustration showing a fastening system 6000 completed by the fastening device installing method 5000 of the fifth embodiment. Before coupling the reel member R13 to the bracket R12, a lace W1 can be provided to pass through the eyelets of the shoe S1 first and then to be coupled to a spool (not shown) of the reel member R13. Subsequently, the reel member R13 can be coupled to the bracket R12 to complete the fastening system 6000. Through operating the reel member R13 to retract or release the lace W1, the shoe S1 can be fastened or loosened.

From the abovementioned embodiment, it is known that, even the shoe S1 does not include the fastening system 6000 after manufacturing or launching and is fastened by a conventional shoe lace passing through the eyelets, the user can still use the fastening device installing method 5000 to couple the fastening device R1 to the shoe S1 and couple the lace W1 to the fastening device R1 to complete the fastening system 6000 which can substitute for the conventional shoe lace. Please be noted that, although the fastening device R1 in the first embodiment to the fifth embodiment is disposed on the tongue S11, the fastening device R1 can be disposed at any part of the shoe S1 depending on the structure of the shoe S1, and the present disclosure is not limited thereto.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An installing hole forming mechanism, comprising:
at least one guiding sleeve comprising a bore; and
an inserting set detachably coupled to the at least one guiding sleeve, the inserting set comprising:
at least one spike configured to couple to the bore of the at least one guiding sleeve, wherein the at least one spike comprises a tip, a neck portion and a spike body, the neck portion is connected between the tip and the spike body, a minimum outer diameter of the neck portion is smaller than a maximum outer diameter of the tip, and the tip, the neck portion and the spike body are integrally formed;
wherein the tip of the at least one spike passes through the bore of the at least one guiding sleeve to expose from the at least one guiding sleeve, an edge of the at least one guiding sleeve rests on the neck portion, and the at least one spike and the at least one guiding sleeve are operated to form at least one installing hole for installing a fastening device.

2. The installing hole forming mechanism of claim 1, further comprising:
a restricting set;
wherein the at least one spike of the inserting set inserting into the restricting set to form the at least one installing hole.

3. The installing hole forming mechanism of claim 2, wherein the restricting set comprises:
a bearing seat comprising two first engaging portions; and
a pressing seat detachably coupled to the bearing seat and comprising:
two second engaging portions engaged with the two first engaging portions, respectively.

4. The installing hole forming mechanism of claim 3, wherein each of the first engaging portions has a toothed belt structure, and each of the second engaging portions has a hole structure.

5. The installing hole forming mechanism of claim 3, wherein,
the inserting set further comprises:
a cap connecting to the at least one spike, the cap comprising two positioning holes, wherein the two positioning holes are spaced from each other; and
the pressing seat located between the cap and the bearing seat, the pressing seat further comprising:
two positioning posts inserting into the two positioning holes, respectively.

6. The installing hole forming mechanism of claim 3, wherein the bearing seat further comprises:
at least one guiding channel configured to guide the at least one spike.

7. The installing hole forming mechanism of claim 3, wherein the bearing seat further comprises an upper arched surface, and the pressing seat further comprises a lower arched surface coordinated with the upper arched surface.

8. The installing hole forming mechanism of claim 1, wherein the tip of the at least one spike has a cone structure, and the tip of the at least one spike has a maximum diameter of 1 mm to 5 mm.

9. The installing hole forming mechanism of claim 1, wherein the tip of the at least one spike has a cone surface, an angle contained between the cone surface of the at least one spike and a central axis of the at least one spike, and the angle is in a range of 1 degree to 45 degrees.

* * * * *